(12) United States Patent
Thompson

(10) Patent No.: US 11,775,937 B2
(45) Date of Patent: Oct. 3, 2023

(54) DYNAMIC CAPACITY RANGES FOR WORKFORCE ROUTING

(71) Applicant: ARRIS Enterprises LLC, Suwanee, GA (US)

(72) Inventor: Stuart Thompson, Beaverton, OR (US)

(73) Assignee: ARRIS Enterprises LLC, Suwanee, GA (US)

(*) Notice: Subject to any disclaimer, the term of this patent is extended or adjusted under 35 U.S.C. 154(b) by 57 days.

(21) Appl. No.: 15/287,481

(22) Filed: Oct. 6, 2016

(65) Prior Publication Data

US 2017/0103369 A1    Apr. 13, 2017

Related U.S. Application Data

(60) Provisional application No. 62/238,937, filed on Oct. 8, 2015.

(51) Int. Cl.
  *G06Q 10/1093* (2023.01)
  *G06Q 10/0631* (2023.01)
  *G06Q 10/047* (2023.01)

(52) U.S. Cl.
  CPC ....... *G06Q 10/1095* (2013.01); *G06Q 10/047* (2013.01); *G06Q 10/06312* (2013.01);
  (Continued)

(58) Field of Classification Search
  CPC .............. G06Q 30/0201; G06Q 50/10; G01C 21/3423; G01C 21/367
  (Continued)

(56) References Cited

U.S. PATENT DOCUMENTS

| | | |
|---|---|---|
| 5,111,391 A | 5/1992 | Fields et al. |
| 5,233,533 A | 8/1993 | Edstrom et al. |

(Continued)

FOREIGN PATENT DOCUMENTS

| | | | |
|---|---|---|---|
| CN | 105913653 A | * | 8/2016 |
| DE | 102019116170 A1 | * | 12/2020 |
| DE | 1020919116170 A1 | * | 12/2020 |

OTHER PUBLICATIONS

NPL search, 2 pages. Nov. 28, 2010, http://www.prtctransit.org/local-bus/pdf/OL-Route1.pdf.*

(Continued)

*Primary Examiner* — Patricia H Munson
*Assistant Examiner* — Thea Labogin
(74) *Attorney, Agent, or Firm* — Chernoff, Vilhauer, McClung & Stenzel, LLP

(57) ABSTRACT

A system and method for workforce scheduling using dynamic capacity ranges are provided. A capacity model associates distances of locations within a service area from a depot with a series of appointment time windows such that appointment time windows having a relatively greater amount of available worker capacity are associated with a greater range of distances than appointment time windows having a relatively smaller amount of available worker capacity. After a distance from the depot to a location of an appointment to be scheduled is determined, appointment time window suggestions are automatically produced based on which appointment time windows as defined in the capacity model are associated with the location of the appointment to be scheduled. As capacity changes due to bookings, the capacity model is dynamically updated. A system and method for workforce routing, based at least in part on using dynamic capacity ranges, are also provided.

19 Claims, 8 Drawing Sheets

(52) U.S. Cl.
CPC . *G06Q 10/06314* (2013.01); *G06Q 10/06316* (2013.01); *G06Q 10/063116* (2013.01)

(58) Field of Classification Search
USPC ........................................................ 705/7.19
See application file for complete search history.

(56) References Cited

U.S. PATENT DOCUMENTS

| | | | |
|---|---|---|---|
| 6,321,133 | B1 | 11/2001 | Smirnov et al. |
| 6,418,398 | B1 | 7/2002 | Dueck et al. |
| 7,788,121 | B1* | 8/2010 | Smith .................... G06Q 10/06 705/7.26 |
| 7,869,946 | B2 | 1/2011 | Couckuyt et al. |
| 8,849,689 | B1 | 9/2014 | Jagannathan et al. |
| 2001/0049619 | A1* | 12/2001 | Powell ........... G06Q 10/063112 705/7.16 |
| 2002/0019759 | A1 | 2/2002 | Arunapuram et al. |
| 2003/0033184 | A1 | 2/2003 | Benbassat et al. |
| 2005/0060217 | A1 | 3/2005 | Douglas et al. |
| 2006/0167734 | A1 | 7/2006 | Scott et al. |
| 2006/0241986 | A1 | 10/2006 | Harper |
| 2006/0262967 | A1 | 11/2006 | Hurst et al. |
| 2007/0038498 | A1 | 2/2007 | Powell et al. |
| 2007/0179829 | A1* | 8/2007 | Laperi ............ G06Q 10/063116 705/7.16 |
| 2010/0312605 | A1* | 12/2010 | Mitchell ................ G06Q 10/06 705/7.13 |
| 2013/0166341 | A1* | 6/2013 | Fullington ............. G06Q 10/06 705/7.14 |
| 2014/0278652 | A1* | 9/2014 | Joyner ........... G06Q 10/063116 705/7.16 |
| 2014/0278654 | A1* | 9/2014 | Candas ............ G06Q 10/06313 705/7.17 |
| 2016/0216873 | A1* | 7/2016 | Filippi ................ G06F 3/04847 |
| 2017/0083585 | A1* | 3/2017 | Chen .................... G06F 11/3006 |

OTHER PUBLICATIONS

NPL search, 2 pages. Nov. 28, 2010, http://www.prtctransit.org/local-bus/pdf/OL-Route1.pdf (Year: 2010).*
Budak, G., Chen, X. Evaluation of the size of time windows for the travelling salesman problem in delivery operations. Complex Intell. Syst. 6, 681-695 (2020). https://doi.org/10.1007/s40747-020-00167 (Year: 2020).*
Voccia, Stacy Ann. "Stochastic Last-Mile Delivery Problems with Time Constraints." ProQuest Dissertations Publishing, 2015. Print. (Year: 2015).*
NPL search, 2 pages. Nov. 28, 2013 http:///www.prtctransit.org/local-bus/pdf/OL-Route1.pdf (Year: 2010) (Year: 2010).*
M. Dorigo, et al., "The ant system: optimization by a colony of cooperating agents", IEEE Transactions on Systems, Man and Cybernetics—Part B, vol. 26, No. 1, 1996, 26 pgs.
L.M. Gambardella, et al., "Solving symmetric and asymmetric TPSs by ant colonies", IEEE Conference on Evolutionary Computation, 1996, pp. 622-627.
L.M. Gambardella, et al., "MACS-VRPTW: A Multiple Ant Colony System for Vehicle Routing Problems with Time Windows", In D. Corne, et al. as editors, New Ideas in Optimization, 1999, 17 pgs.
L.M. Gambardella, et al., "An Ant Colony System Hybridized with a New Local Search for the Sequential Ordering Problem", Informs Journal on Computing, vol. 12, No. 3, Summer 2000, pp. 237-255.
L.M. Gambardella, et al., "Ant Colony Optimization for Vehicle Routing Problems: From Theory to Applications", Galleria Rassegna Bimestrale di Cultura 9, No. 1, pp. 1-50, 2004.
M. Constantino, et al., "The mixed capacitated arc routing problem with non-overlapping routes", European Journal of Operational Research, vol. 244, Issue 2, pp. 445-456, Jul. 2015 (available online Jan. 29, 2015).
B.L. Hollis, et al., "Real-Life Vehicle Routing with Time Windows for Visual Attractiveness and Operational Robustness", Asia-Pacific Journal of Operational Research, vol. 29, No. 4, 1250017-1 [29 pages], DOI: 10.1142/S0217595912500170, Aug. 2012.
ClickSoftware Technologies Ltd., "Street-Level Routing: Where the Rubber Meets the Road", URL:www.clicksoftware.com/globalassets/aasite_assets/documents/bp/bp_street-level-routing_en.pdf, 12 pages, 2014.
"OptaPlanner User Guide", jboss.org, Community Documentation, Version 6.0.0, 137 pgs.
P. Kilby, et al., "Flexible routing combing Constraint Programming, Large Neighbourhood Search, and Feature-based Insertion", Proceedings on 2nd Workshop on Artificial Intelligence and Logistics, 22nd International Joint Conference on Artificial Intelligence (IJCAI), edited by K. Schill, et al. on Jul. 16, 2011, pp. 43-48.
A. Poot, et al., "A Savings Based Method for Real-Life Vehicle Routing Problems", Econometric Institute Report EI9938/A, Aug. 1, 1999, pp. 1-18.
G. Rand, "The life and times of the Savings Method for Vehicle Routing Problems", ORiON, vol. 25(2), 2009, pp. 125-145.
V. Tam, et al., "An Effective Search Framework Combining Meta-Heuristics to Solve the Vehicle Routing Problems with Time Windows", Intechopen, 2008, 23 pgs.
R. Garrido, et al., "Natural Behavior Based Metaheuristics for the Vehicle Routing Problem with Time Window", NICSO 2006, Proceedings of the Workshop on Nature Inspired Cooperative Strategies for Optimization, edited by D. Pelta, et al. pp. 15-24.
C. Gretton, et al., "A Study of Shape Penalties in Vehicle Routing", Optimisation Research Group, NICTA, 4 pgs.
M. Hosny, "Heuristic Techniques for Solving the Vehicle Routing Problem with Time Windows", 2011 International Conference on Future Information Technology, IPCSIT vol. 13, 2011, pp. 19-23.
PCT Search Report & Written Opinion, RE: Application No. PCT/US2016/055992, dated Nov. 30, 2016.
Official Action, RE: Canadian Application No. 3,000,883, dated Feb. 20, 2019.
Official Action, RE: Canadian Application No. 3,000,883, dated Jan. 27, 2020.

* cited by examiner

ITERATIVE ROUTE CREATION

WHILE AT LEAST ONE WORKER IS ACTIVE

FOR-EACH WORKER IN ACTIVE WORKERS

RANK AVAILABLE ARCS

END FOR

FOR EACH WORKER IN ACTIVE WORKERS

WHILE ARCS HAVE CONTENTION

FOR EACH ARC WITH CONTENTION

SELECT WINNER

LOSERS MOVE TO NEXT RANKED JOB

END FOR

END WHILE

PROCESS ARCS WITHOUT CONTENTION

END FOR

END WHILE

DYNAMIC CAPACITY RANGES FOR WORKFORCE ROUTING

CROSS REFERENCE TO RELATED APPLICATIONS

This application claims the benefit under 35 USC § 119(e) of U.S. Provisional Patent Application No. 62/238,937, filed Oct. 8, 2015.

BACKGROUND

A customer wishing to make a service appointment is typically assisted by a booking agent. The booking agent, in some cases, is able to make decisions about availability of field service representatives (FSRs) for scheduling appointments, based, for example, upon estimates of worker capacity and filling daily quotas.

In a typical workforce routing scenario, a pool of FSRs must collectively service a set of jobs distributed over a geographic area. Ordinarily, jobs may only be serviced within certain time windows, technicians have restrictions upon the jobs they can perform, and routes must be determined for each technician such that all jobs are serviced. Routes may be selected based upon a set of criteria that may include factors such as total travel time and distance, slack time between jobs, and capacity. The set of criteria may represent a business policy or may otherwise reflect trade-offs that are to be considered when determining routes.

Finding optimal routes for FSRs and jobs is an NP-complete problem (e.g., the well-known traveling salesman problem), and a problem that has been computationally impractical to solve through traditional means. Efficient travel through a region may not be achievable through straight paths, e.g., due to roads, traffic, and impediments. Determining the optimal route between multiple points at the time of routing reduces the efficiency of the routing algorithm. Optimal street level routing (SLR) has traditionally been regarded as computationally impractical due to the significant number of permutations of potential paths. In addition, subjective factors can influence perceived quality of a route, as perceived by an FSR.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
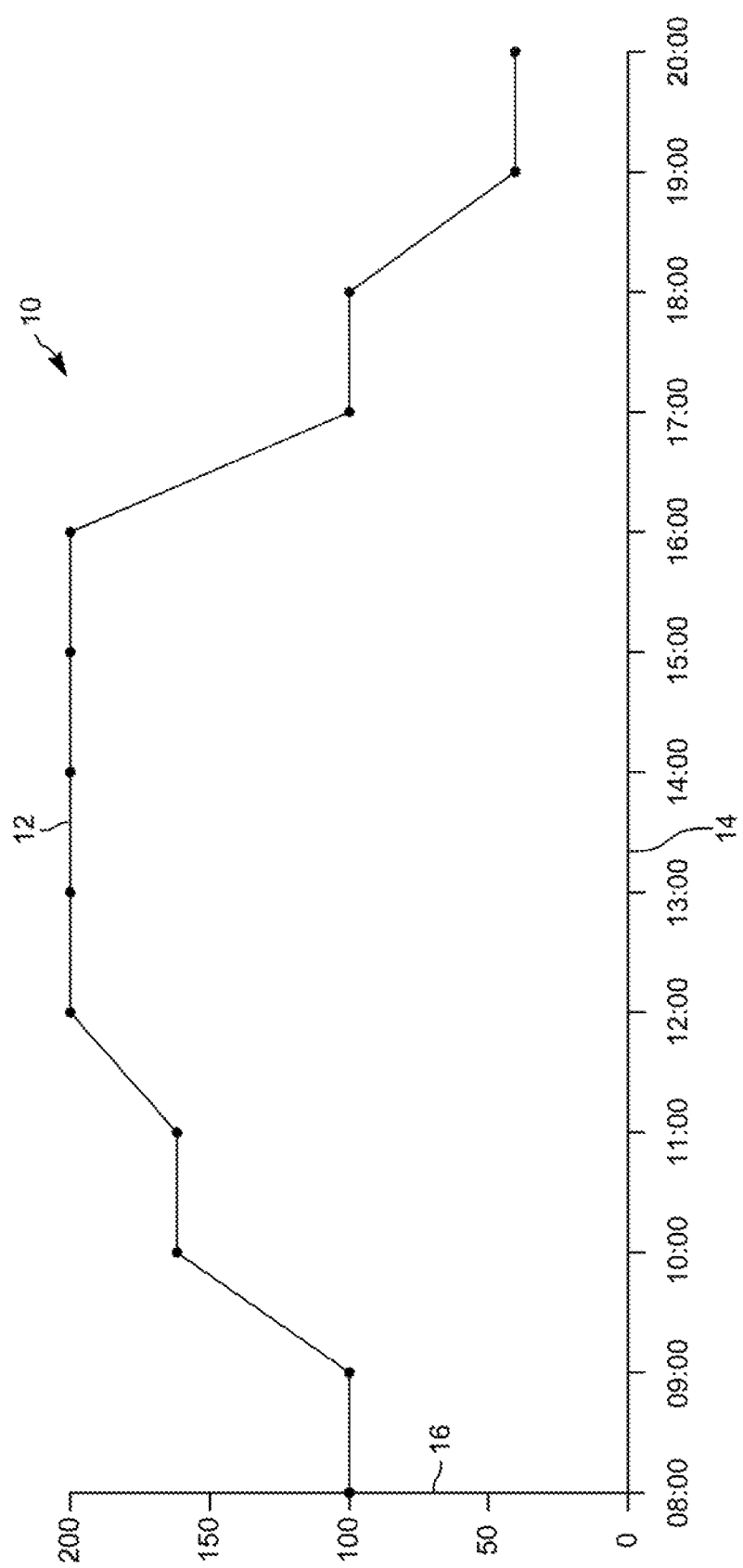
FIG. 1 is a graph showing effective available worker coverage or capacity per appointment time window during the course of an aggregate of shifts of a work day in accordance to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Embodiments described herein disclose systems and methods that provide a booking agent with information for suggesting or selecting desirable service appointment windows for jobs during an appointment scheduling process. The information and suggestions provided are not merely limited to available workforce capacity.

Illustrative examples of a booking agent, in various embodiments, include one or more of a customer service representative (CSR), and a computer-implemented appointment scheduling system, service, or application (e.g., an interactive scheduling system for use by a CSR, a web-based scheduling system or other automated interactive system for use by a customer, and the like).

The appointment scheduling process necessarily occurs first and precedes the use of or any consideration for workforce routing algorithms which actually assign specific sequences of job locations to specific workers during a particular work day or shift. Thus, the route generation process necessarily occurs after the appointment times have already been established and set by the booking agent, and these functions are separate and one is not considered relative to the other.

Conventionally, when a booking agent makes decisions about availability of FSRs for scheduling appointments, little information is typically available to the booking agent to enable efficient chaining of appointments within the locales. While worker capacity may be tracked, for example, using an estimated number of available workers covering a set of known shift patterns, this information may only be used by a booking agent to distribute appointments at times of day so that the appointments occur evenly across the shifts that are worked. Accordingly, booking agents have conventionally considered no information needed for efficiently grouping the appointments physically with respect to times and locations. Thus, while an even distribution over workers' shift periods may be achieved via conventional approaches, the physical distribution of appointment destinations may result in routes that involve significant over-traversal of the working area.

Accordingly, a problem occurs due to appointment scheduling not making any attempt to schedule appointments in a manner that addresses the ability to produce efficient grouping or chaining of a sequence of appointments based upon physical location of the jobs. As stated above, when scheduling service appointments, customer service representatives or other booking agents necessarily must make decisions about schedule availability based upon estimates of remaining worker shift capacity and the need to fill daily quotas; however, they are without information needed to address the above stated problem with respect to efficient grouping of job locations throughout a work day or shift.

While sufficient workforce coverage may exist during a particular time window, the physical distribution of appointments during that timeframe may lead to significant difficulties in field workers arriving at the job locations in a timely fashion because the physical distribution of appointment destinations may result in significant over-traversal of the working area. This can have an effect throughout a workday leading to many late arrivals and missed appointments.

In contrast to the above referenced conventional systems, embodiments disclosed herein, enable the booking agent to have advance knowledge and information to better conform the service appointments as they are taken to so-called venturing and homing patterns preferred by field workers and that better meet business objectives. By necessity, this must occur at an early stage of the scheduling process before any use of detailed street-level optimizers or workforce routing algorithms construct routes for the workforce for a particular work day, shift, or aggregate of shifts from pre-booked appointments.

Accordingly, embodiments disclosed herein help a booking agent to make better decisions concerning the scheduling of customer time windows and is based upon the physical or geographic locations of the jobs paired with knowledge about existing commitments. Thus, it is deemed desirable for the embodiments disclosed herein to inform customer service representatives at the time of taking appointments from customers about ideal times of day to offer a particular customer at a particular location a particular service window, not simply from a capacity perspective, but with knowledge about physical location of jobs and workers so that appointments may be efficiently chained in a manner ideal for subsequent workforce routing by the router (whether human or automated). By stacking the deck ahead of time (i.e., by initially defining an ideal service window with the customer), a workforce routing algorithm is provided with the most ideal scenario and set of appointments for efficiently chaining a sequence of routes in accordance to physical locations of job sites.

In the field of workforce routing, the concept of fan-out, fan-in is generally known. The desirability of a fan-out, fan-in pattern, as disclosed herein, stems from at least the following motivations. First, perceived driver efficiency is higher when routes avoid back-tracking. Whether or not a route is more mathematically efficient than a hypothetical alternative route can be a lower-priority concern than human factors such as dispatcher and driver satisfaction with the routes that are presented. Second, when assistance or additional coverage is needed, the so-called "tree rings" that are created by such a pattern, in some embodiments disclosed herein, are able to generally place all workers in roughly the same strata within the service area as one another throughout the day. This provides greater opportunity for workers to assist one another while still covering the entire area (i.e., avoiding a so called "bee hive" pattern where all workers clump together).

A further concept of workforce routing involves so-called bisecting coverage which refers to an out-in pattern, wherein the union of coverage of shifts is bisected. According to embodiments disclosed herein, coverage is split down the center of the aggregate of shift patterns to allow the greatest opportunity for workers to assist one another. By centering the fan-out, fan-in pattern on the center of the aggregate of all worked shifts, a natural center point of coverage is established. Over time, this should give a natural human understanding of the time of day that workers reach the outer boundary for a service area and therefore an understanding of where most workers will be at a particular time of day. This information may be also be utilized to lead to a better understanding of how to perform labor forecasting.

In addition, the maximum radius for a depot from which workers are initially dispatched during a shift for providing service in a service area covered by the depot defines the working boundary for a specific service area. This may also be referred to as the so-called "rMAX" (Maximum Radius for Depot). Job locations outside of the rMAX boundary will generally not be considered by workers dispatched from the depot in the specific service area.

Further, embodiments may use outbound and inbound time poles (i.e., so-called Asymmetric Time Poles) of different scales. For instance, according to embodiments disclosed herein, the width of the so-called "tree-rings" in an outgoing portion of the day will be different than the widths of their counterparts in an incoming section (e.g., the width of the first hour of the day may be different than the width of the last hour of the day), and accordingly the outgoing and incoming ring patterns are not necessarily expected to be symmetrical.

Still further, times or time ranges are typically based on increments of a number of minutes; conventionally, fifteen minutes is generally considered useful for providing a range within which a human technician can be considered "on time" (i.e., fifteen-minute increments). As a psychological factor, FSRs, booking agents, and others may respond negatively to more precise times (e.g., scheduling down to the minute), which would imply a higher degree of accuracy than real-world conditions will generally permit. If a booking agent promises that an FSR will arrive at 10:15 and the FSR is five minutes late, the lateness is more easily excused as part of life than if the booking agent promises the FSR will arrive at 10:07. Where a time appears to be expressed more precisely, an inference of high accuracy may result in a shorter period of lateness being less easily excused.

Embodiments of methods and systems used for booking appointments are provided by way of the following example.

Dynamic Capacity Ranges Example

The following is an example walkthrough, in an embodiment, of how a method causes appointment times to be recommended by a booking agent based upon job location and current bookings.

In this example, it is assumed that a depot has 200 workers split into three groups with each group working a different shift. Each shift may have a total duration of eight hours. The distribution of the workers and their shifts for this example may be as follows:

100 workers—08:00-16:00 shift
60 workers—10:00-18:00 shift
40 workers—12:00-20:00 shift In terms of worker coverage per hour (i.e., workforce capacity in each hour), the following can be derived from the above scenario of shifts and number of workers throughout an aggregate of the shifts from 8:00 to 20:00 which may define a work day for the depot.

08:00—100 workers
09:00—100 workers
10:00—160 workers

11:00—160 workers
12:00—200 workers
13:00—200 workers
14:00—200 workers
15:00—200 workers
16:00—200 workers
17:00—100 workers
18:00—100 workers
19:00—40 workers
20:00—40 workers The above information is plotted in graph 10 of FIG. 1. The line 12 provides information describing the availability of workers throughout the day. The X-axis 14 corresponds to time throughout the aggregate of shifts, and the Y-axis 16 identifies the number of workers. Each dot in the graph 10 represents the number of workers available to be assigned jobs at the beginning of each hour. The line 12 in graph 10 is formed by connecting the dots. See FIG. 1.

Figure 2:
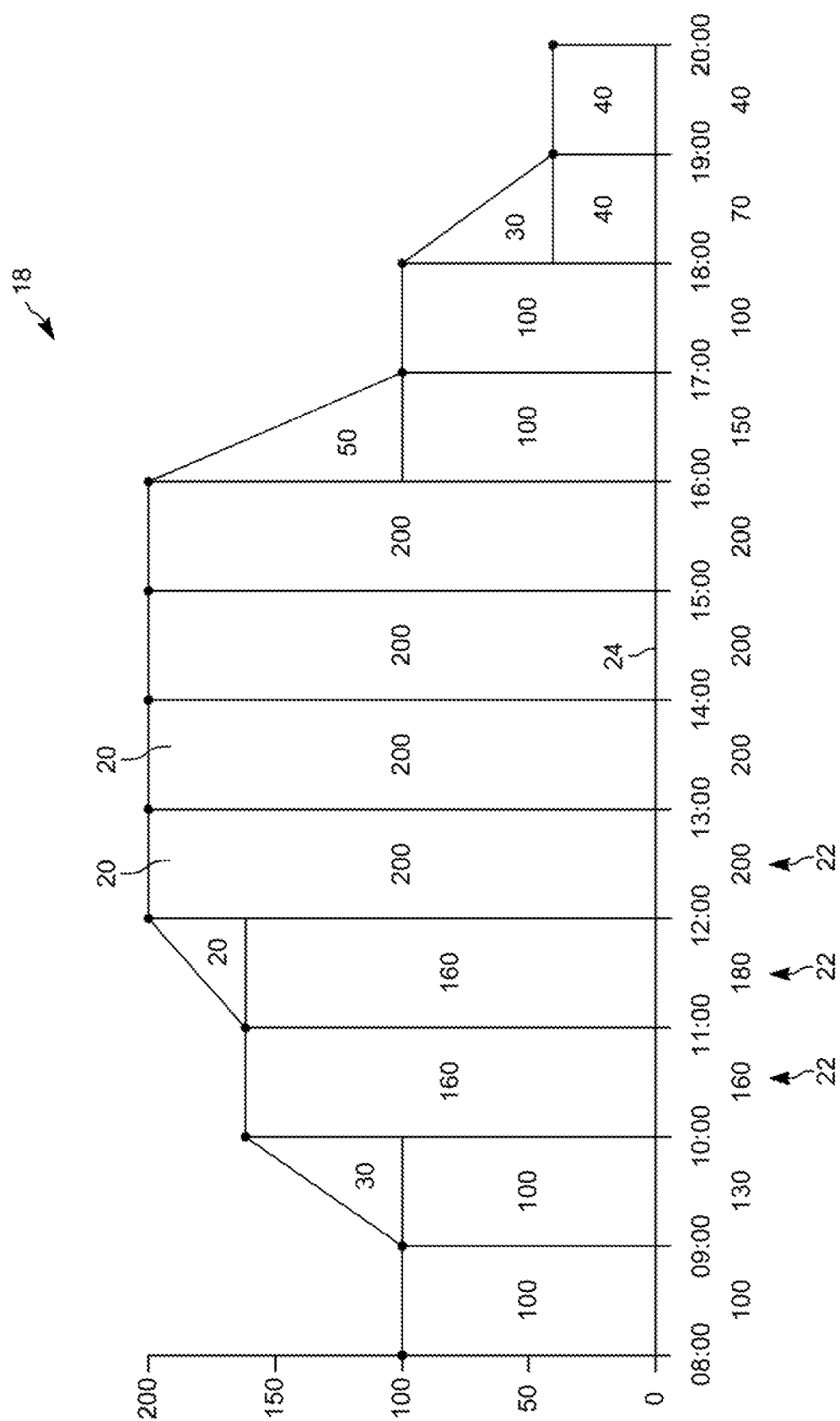
FIG. 2 is a graph showing effective available worker coverage or capacity per appointment time window and values therefor during the course of an aggregate of shifts of a work day in accordance to an embodiment.

FIG. 2 provides a graph 18 that includes the same line 12 as presented in FIG. 1. However, in FIG. 2, effective coverages for time windows are derived by calculating the area 20 under the line 12 per time window (in this example, each time window is exactly one hour). Thus, FIG. 2 provides a relative view of effective worker coverages within coarse-grain time windows. It should be noted that the effective coverages are necessarily different from actual coverages. For instance, in the time window 9:00-10:00 there are actually 100 workers according to the example. However, since the line 12 rises from 100 workers at 9:00 to 160 workers at 10:00 (i.e., the beginning of the next shift), the effective coverage for 9:00 to 10:00 determined from the area under line 12 is 130 workers as shown in FIG. 2. Accordingly, the total area 20 for each time window is displayed beneath each time window below the X-axis 24 of FIG. 2.

After the effective coverage for each time window has been calculated as described above (see the total area listed under each time window in FIG. 2), a relative measure of coverage between different appointment time windows can be determined. This forms the basis of the relative distances between time markers that can be provide on a so-called distance line, which is discussed below in greater detail.

Referring to FIG. 2, the 08:00 to 09:00 window (total area of 100, i.e. 100 effective coverage of workers) is one half (100/200 or 50%) as well effectively covered as the 12:00 to 13:00 window (total area of 200, i.e. 200 effective coverage of workers), whereas the 10:00 to 11:00 window (160 effective coverage of workers) window is four-fifths (160/200 or 80%) as well covered as the 14:00 to 15:00 window (200 effective coverage of workers).

Figure 3:
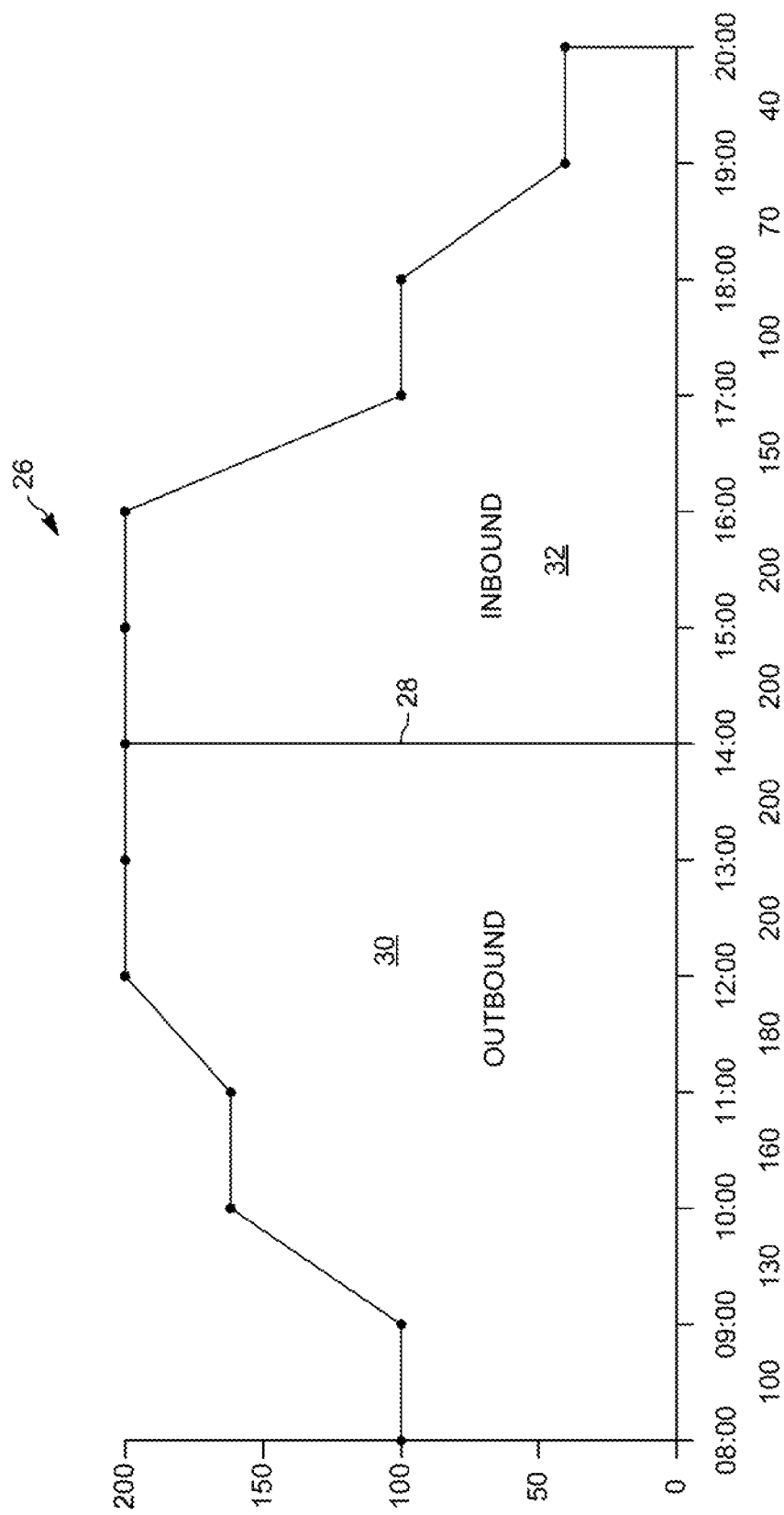
FIG. 3 is a graph showing effective available worker coverage or capacity per appointment time window and a transition between outbound travel and inbound travel of workers during the course of an aggregate of shifts of a work day in accordance to an embodiment.

For purposes of defining so-called bisecting coverage in the example discussed above, FIG. 3 depicts an illustrative example of bisecting coverage according to the scenario discussed above. FIG. 3 is a graph 26 that include line 12 shown in FIG. 1 and the total area information 22 per time window as shown in FIG. 2. In addition, the graph 26 includes a bisecting line 28 to split the total coverage window of the example into two portions.

In an embodiment, the bisecting line 28 reinforces the concept of implied routes proceeding outwards at the start of shifts (i.e., between 8:00 and 14:00 in FIG. 3) and then inward toward the end of the shifts (i.e., between 14:00 and 20:00 in FIG. 3). Thus, as shown in FIG. 3, the midpoint of the 08:00 to 20:00 shifts in this particular example is 14:00 and is therefore the transition point at which the outbound and inbound portions, 30 and 32, of worker coverage are split. In FIG. 3, the bisecting line 28 is located between the portions, 30 and 32, which are labeled "Outbound" and "Inbound" in the graph 26.

Figure 4:
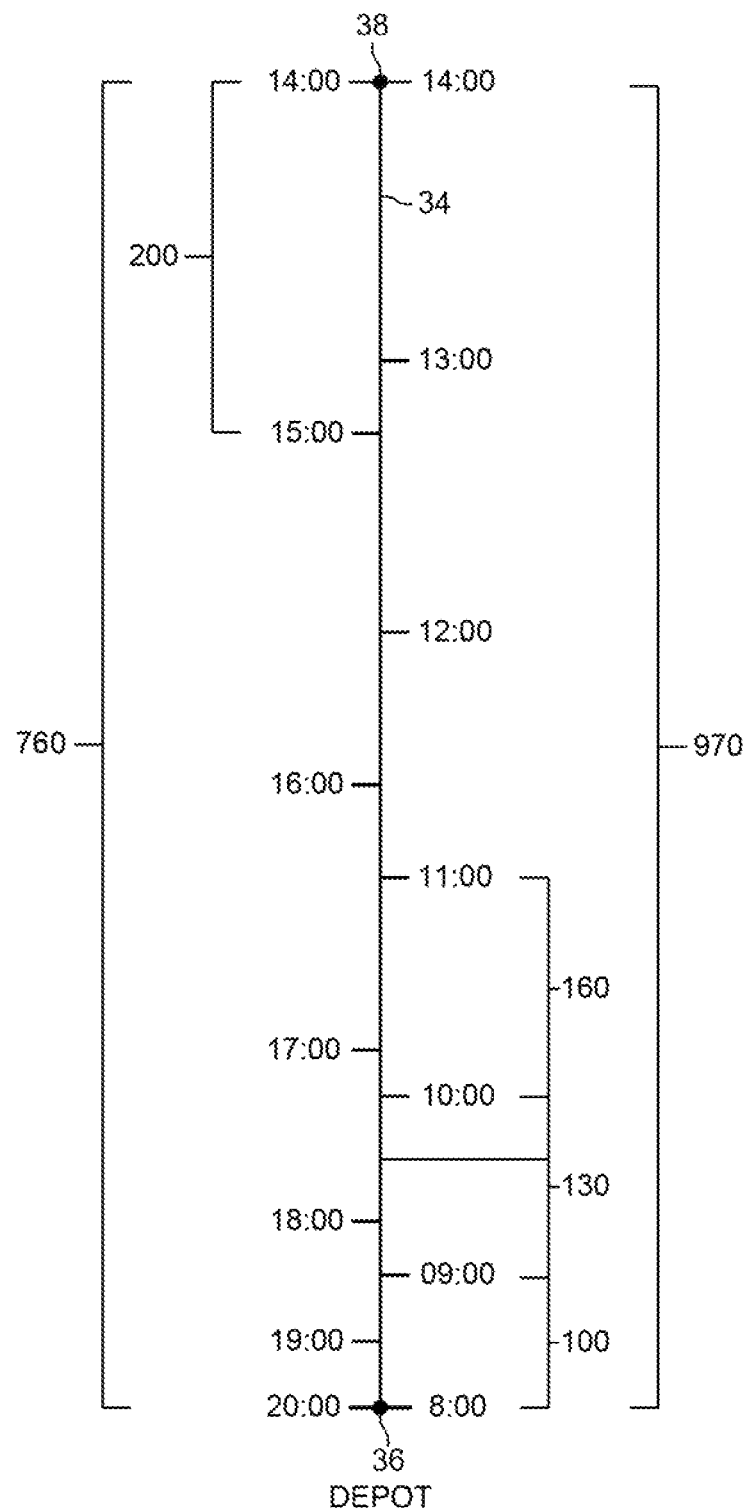
FIG. 4 is a so-called distance line representing a capacity model in accordance to an embodiment.

From the above information provided by graphs 10, 18 and 26, the generation of a so-called "Distance Line" 34 is enabled and an example is shown in FIG. 4. The distance line 34 represents the distances associated with particular time markers or windows and may be is used to suggest times for new job appointments to be entered into an appointment scheduling system by a booking agent. Through use of the information provided by the distance line 34, suggestions are able to be generated based upon knowledge of the distance from a depot 36 of the new job location to be scheduled. Thus, knowledge of the depot-to-job location distance and its application to the capacity model (i.e., distance line 34) is all that is needed for embodiments to make a suggestion for an appointment time window.

The length of the distance line 34 represents the maximum distance that is serviced by the depot (i.e., it defines the outmost location within the coverage or service area or rMAX). Thus, the end 38 of the distance line 34 corresponds to the rMAX distance for the depot 36. In addition, the outbound-to-inbound transition defined by line 28 in FIG. 3 is correlated to the end 38 of the distance line 34 (this represents the maximum distance serviced by the depot). Thus, the end 38 of the distance line 34 automatically corresponds to the time 14:00 as defined by line 28 in FIG. 3 (i.e., distance is correlated to time). The outbound and inbound time markers or windows are thereafter placed along the height or length of the distance line 34 according to their relative weights in terms of worker coverage discussed above. See FIG. 4

Merely for purposes of example, Table 1 provided below illustrates the percentage of the distance line 34 each time window occupies. The percentage is calculated by dividing the effective coverage or weight for a window by the total weight of all the windows within either the outbound or inbound portions defined in FIG. 3. For instance, referring to FIG. 3 and adding all the total effective coverages of each window in the outbound portion of the graph, a total weight for outbound is 970 (i.e., 100+130+160+180+200+200 for the outbound period of 8:00 to 14:00). A total weight for inbound is 760 (i.e., 200+200+150+100+70+40 for the inbound period of 14:00 to 20:00).

Accordingly, the 08:00-09:00 window with an effective coverage or weight of 100 receives a percentage of 10.3% (i.e., (100/970)×100%=10.3%. With reference to FIG. 4, the distance line 34 is plotted using the relative weights as shown in Table 1.

TABLE 1

| OUTBOUND | | | INBOUND | | |
| --- | --- | --- | --- | --- | --- |
| Time | Weight | Percent | Time | Weight | Percent |
| 8:00-9:00 | 100 | 10.3 | 14:00-15:00 | 200 | 26.3 |
| 9:00-10:00 | 130 | 13.4 | 15:00-16:00 | 200 | 26.3 |
| 10:00-11:00 | 160 | 16.5 | 16:00-17:00 | 150 | 19.7 |
| 11:00-12:00 | 180 | 18.6 | 17:00-18:00 | 100 | 13.2 |
| 12:00-13:00 | 200 | 20.6 | 18:00-19:00 | 70 | 9.2 |
| 13:00-14:00 | 200 | 20.6 | 19:00-20:00 | 40 | 5.3 |
| TOTAL | 970 | 100.0 | TOTAL | 760 | 100.0 |

In FIG. 4, the outbound scale (on the right-hand side of FIG. 4) is different than the inbound scale (on the left-hand side of FIG. 4) due to more worker coverage in the earlier outbound part of the day (i.e., 970 as compared to 760). Periods of low coverage, such as 18:00-19:00 and 19:00-20:00 occupy relatively short distances on the distance line 34. See these windows near depot 38 in distance line 34.

The distance line 34 shown in FIG. 4 describes or models, in the illustrative example of an embodiment, the ideal times for scheduling of a new appointment in direct correlation to the distance from the depot of a job location to be scheduled. As discussed above, the upper end 38 of the distance line 34 represents the furthest distance or rMAX that the depot will serve and the transition point between outbound travel and inbound travel of workers.

When a new job request is received, the location of the job request and distance from the depot 36 can be readily determined or obtained. For instance, a job location located half the rMAX distance will be located half way up the distance line 34. In this manner, times and appointment windows can be recommended corresponding to the nearest inbound and outbound times and windows shown on the distance line 34. For instance, a new job located half the distance between the depot and the rMAX location may be given a time window for an appointment corresponding to the 11:00-1200 time window during the outbound portion of the day or the 15:00-16:00 time window during the inbound portion of the day.

Since jobs will often fall between time markers or windows, in an embodiment, the recommended times may be returned to the nearest fifteen minutes and the values may be interpolated. For example, if a job needing an appointment is located a distance away from the depot such that it falls on the distance line 34 exactly corresponding to the 16:00 marker, both the times 16:00 and 11:15 may be recommended since those are the closest times quantized on fifteen minute windows. Of course, this represents one example, and the time windows can have any length, as desired, such as 10 minutes, 20 minutes, 30 minutes, an hour, and the like.

Figure 5A:
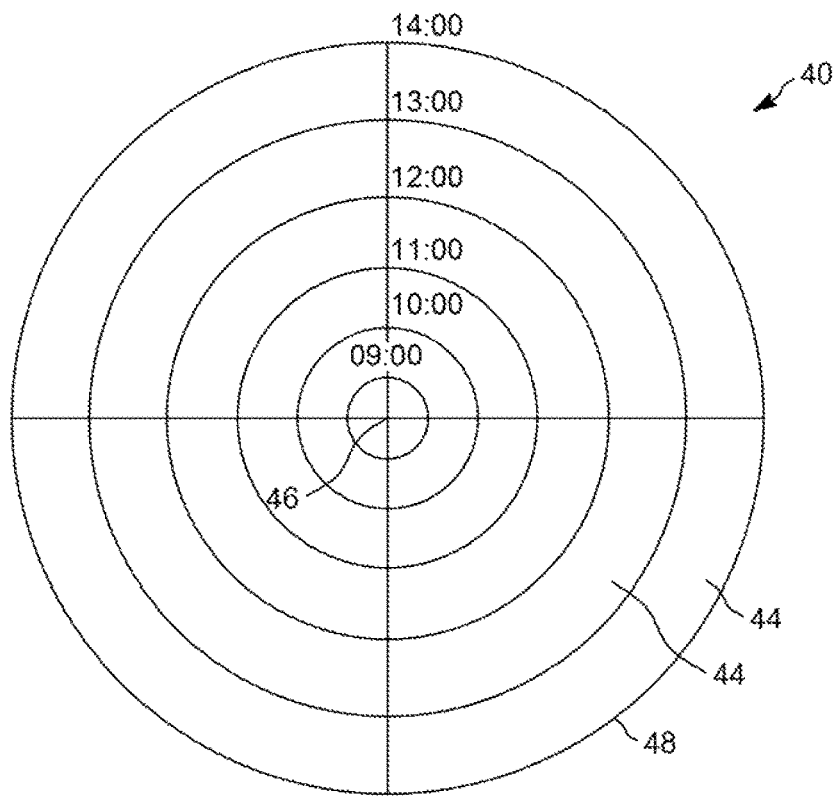
FIG. 5A is a radial plot representing a capacity model for an outbound portion of the work day in accordance to an embodiment.
Figure 5B:
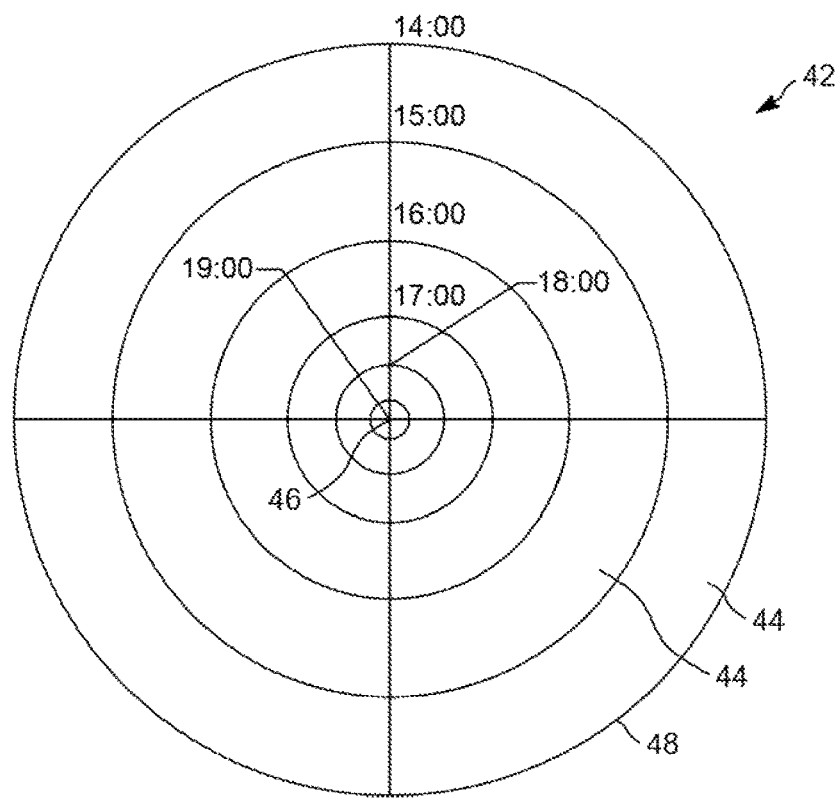
FIG. 5B is a radial plot representing a capacity model for an inbound portion of the work day in accordance to an embodiment.

The information provided in FIG. 4 can also be plotted radially as shown, for instance, in FIGS. 5A and 5B which depict radial plots 40 (corresponding to outbound travel from the depot) and 42 (corresponding to inbound travel to the depot), respectively. Each of the radial plots, 40 and 42, include so-called coverage rings 44 (i.e., so-called tree-rings) which represent time windows in an illustrative example of an embodiment. Thus, using the distance line 34 of FIG. 4, the radial plots can be generated illustrating coverage rings by time windows.

The radial plot 40 of FIG. 5A depicts outbound time windows (rings at 9:00 to 14:00) as concentric rings, with the time window 8:00-9:00 located at the center 46 (corresponding to depot location) of the radial plot and 14:00 forming the outer edge 48 of the radial plot (corresponding to the rMAX distance of the depot). Likewise, FIG. 5B depicts inbound time windows (rings at 14:00 to 19:00) as concentric rings, with 14:00 at the outer edge 48, and the time window 19:00-20:00 at the center 46.

In FIGS. 5A and 5B, time windows (i.e., tree-rings) with more effective worker coverage or capacity as discussed above are wider and time windows with lower effective worker coverage or capacity are narrower. Thus, wider time windows are associated with a greater percentage of distances along the distance line 34. For instance, the time window 18:00-19:00 in FIG. 5B is narrow as compared to the time window 14:00-15:00. Since the wider rings cover more area (i.e., more distance), there is a higher chance that new jobs will fall within those areas (i.e., the rings that are wider) and correspondingly within the time windows with higher coverage.

Figure 6A:
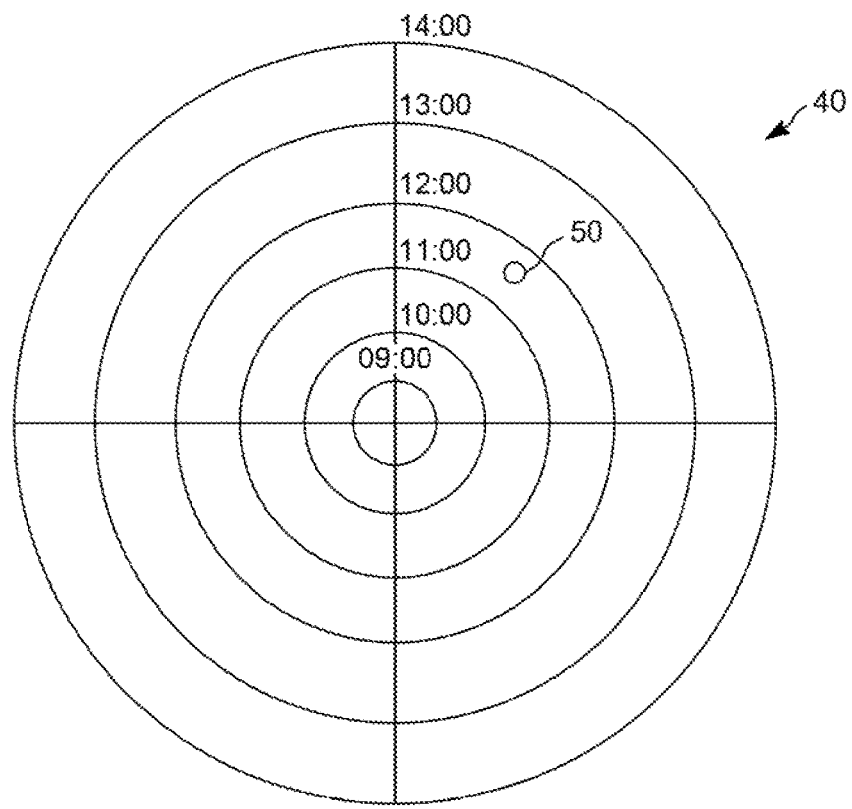
FIG. 6A is a radial plot representing a capacity model for an outbound portion of the work day on which the distance of a new job location under consideration for scheduling is shown in accordance to an embodiment.
Figure 6B:
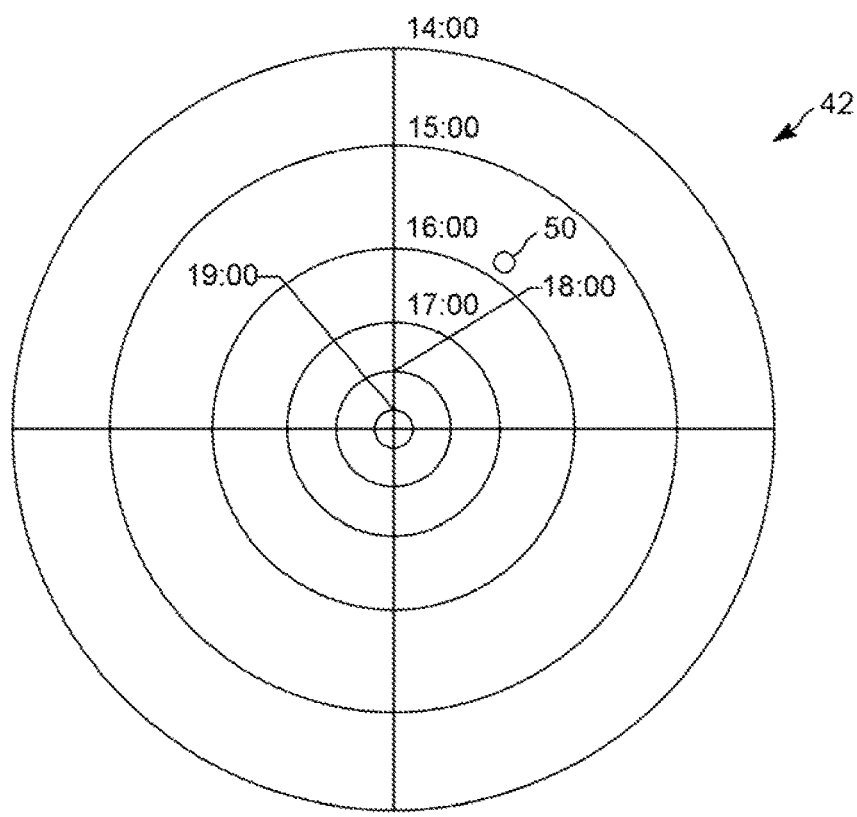
FIG. 6B is a radial plot representing a capacity model for an inbound portion of the work day on which the distance of a new job location under consideration for scheduling is shown in accordance to an embodiment.

FIGS. 6A and 6B depict the same radial plots, 40 and 42, as shown in FIGS. 5A and 5B. The radial plots define coverage rings based on time windows and distance of the job from the depot and may be used by a booking agent to schedule appointments in accordance with embodiments. For example, when a new job request is received for scheduling, a dot or symbol 50 is marked on the plots, 40 and 42, corresponding to the physical or geographic location of the job within the service area (i.e., its distance from the depot). The dot 50 is used to determine which times would be most favorable for the booking agent to suggest. In the example depicted in FIGS. 6A and 6B, the dot 50 is closest to the 11:30 outbound slot (FIG. 6A) and to the 16:00 inbound slot (FIG. 6B). Accordingly, these are the times that would be suggested to a booking agent according to an embodiment.

After a job is booked, the effective worker coverage value discussed above is updated by adjusting the information on the graphs, distance line, radial plots and widths of rings thereon. For instance, assuming that the customer located as discussed above is offered the choice of 11:30 and 16:00 by the booking agent and selects the 11:30 time slot, availability or coverage capacity for the 11:00-12:00 time window would be decremented by one. Rather than the initial 180 effective coverage value for the 11:00-12:00 time window as initially indicated in FIG. 2, this value would now be adjusted to 179. This, in turn, affects the distance line 34 and radial plots, 40 and 42.

As more jobs are booked within a particular time window, the availability or effective capacity for that time window will decrease relative to the other time windows, which will cause the distance line and corresponding radial plots to compress for such a time window. The windows with less remaining availability/worker capacity will become narrower. In contrast, the time windows with more remaining worker capacity will become wider. This encourages new jobs to be booked in the time windows with the most remaining availability/worker capacity. Thus, referring to the graphical representation shown in FIGS. 6A and 6B, when plotting "windows" or "rings" of capacity, a time ring is wider if there are more workers, and shrinks as more appointments are booked. The graphs, distance line, and plots of the model are dynamically updated throughout the scheduling process.

By causing a booking agent to select appointment time windows using some or all of the foregoing information and methods at the time of scheduling appointments (i.e., before a particular worker is assigned the job within a sequence of routes), embodiments disclosed herein are able to significantly reduce the number of jobs subsequently left unassigned by an automated workforce routing system or algorithm. For example, in a simulation having 500 jobs and 100 workers, in comparison to a control run with a substantially random assignment of capacity, an embodiment in which capacity was assigned using at least aspects of the embodiments disclose herein was able to provide improvements that reduced the number of jobs remaining unassigned. For instance, unassigned jobs may be reduced by 60% to 80% as compared to conventional methods.

In some embodiments, worker schedules may be estimated or predicted ahead of time (e.g., one or more days into the future) to assist with routing on the day of appointment. Also, in some embodiments, travel distance for a job may be estimated using straight-line distances, e.g., to save computation time. Such an estimate can, in some cases, provide a more generally useful advance representation than computation of street-level distances, since travel conditions may in some cases change significantly between the day that an appointment is made and the day of the appointment or of the routing for the appointment.

Some embodiments disclosed herein may be used to provide value outside the area of pre-processing for workforce routing. For example, the embodiments described above may be used to provide information for capacity refinements and predictions, instead of for booking. The embodiments disclosed above may be computationally simpler than a full routing solution in that fewer factors (e.g., traffic, etc.) need to be taken into consideration. Accordingly, these embodiments may be useful, for example, for labor forecasting, as well as routing and scheduling, and can help to provide higher efficiency routes, e.g., with respect to capacity.

Automatic Workforce Routing

Aspects of the above disclosure with respect to selecting appointment times for jobs may be usable, for example, as a pre-processing tool for improving the results produced by an automatic workforce routing system which builds routes for technicians including a sequence of jobs over the course of a technician's shift. The following is an illustrative example of an embodiment of an automatic workforce routing system suitable for use with the embodiments disclosed above in the previous example.

As discussed above, in workforce management systems responsible for creating worker routes, there exists a need to influence and audit the routes that are created via a set of business objectives. The solutions to vehicle routing optimization problems often involve metaheuristics that are difficult, if not impossible, to both configure and audit in this way. Probabilities lead towards similar solutions on subsequent searches but are not guaranteed and a trade-off is necessary between available execution time and the quality of the solutions that are found. In a deterministic system, the trade-off is a gain in the ability to more tightly configure and audit solutions at the expense of potential optimizations.

With larger numbers of distinguishing traits, more tightly constrained business objectives, and larger pools of workers, a next-best-ranked search can build solutions that satisfy the objectives quickly. Furthermore, the solutions can be audited as the results are entirely deterministic. Accordingly, the use of dynamic temporal weighting components permits choices to be constrained even further and can be encoded to reflect conditions such as traffic, desires to venture and home, system-wide balance, and a need to pair workers with jobs appropriate to their skill levels and inventory.

Route creation may use configurable weighting components to deterministically assign routes to technicians based upon weighted choice mechanics. A model is presented herein of a modular routing service capable of answering questions from perspectives beyond route creation. A deterministic approach is taken with the goal of servicing requests for in-depth analysis behind the choices that are made. Models are described offering previews of how changes in configuration affect potential outcomes.

In an embodiment, the approach uses a process wherein workers attempt to take their highest ranked options at every iteration of the job selection process. A virtual mediator may resolve conflicts between workers that wish to select the same job. The mediation process may involve a balance metric that prevents the same workers from winning or losing repeatedly. Weighting components are used to calculate the relative value of a job at different points in the route creation process. These components represent not only the business objectives but also the changing nature of value throughout route construction.

In an embodiment, the route creation process is iterative. All workers begin at their start locations and receive a single job assignment per iteration until a set of stop conditions are met such as reaching the end of their shift or finding no remaining viable jobs from which to choose. The route creation process ends when all workers have met their stop conditions.

Options are ranked by computing a discrete value for each option and then sorting by that value. The score for each job represents the attractiveness of that job to a specific worker and at a specific point in the route creation process. The value of a job varies due to a variety of dynamic conditions, such as traffic, current workload, the need for breaks, and softer criteria such as the desire for aesthetically pleasing route shapes and a need to finish near a stated home location.

Arcs represent the physical routes between jobs. Each job has many incoming and outgoing arcs. When workers rank their options, they consider factors about both the arcs (travel time, distance, traffic conditions, etc.) and the jobs (skills required, time windows, etc.).

Values from several scoring components are combined into a final composite score for each arc available to a worker. Each component returns a value in the range $0 \leq s \leq 1$.

The individual component weights are scaled using their strengthening coefficients and added together to produce the final score. This may be represented by the formula:

$$s = \Sigma w = \text{final arc score}$$

c=strengthening coefficient
w=raw component weighting value

Figures 9, 10:
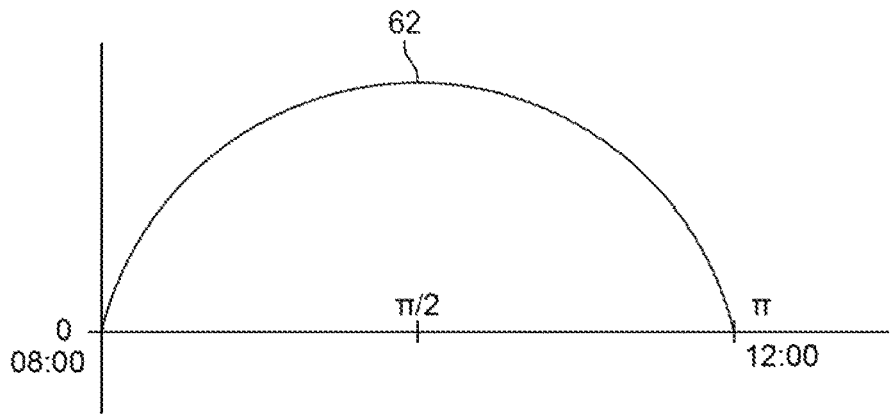
FIG. 9 is a plot of a venturing/homing amplification factor over the course of a shift of the workers in the example shown in FIGS. 7 and 8 in accordance to an embodiment.
FIG. 10 is example of pseudo-code for an iterative route creation process in accordance to an embodiment.

An illustrative example of pseudo-code 52 for a route creation process, according to one embodiment, is provided in FIG. 10. During step 54, for each active worker, each arc, or each job in a set of job locations available to be scheduled, is scored and a ranking of jobs from highest to lowest is generated per worker. Thus, in step 58, if a job is the top ranking for only one worker, then that worker is assigned the job (i.e., the highest ranked job for the specific worker). However, in step 56, for a job that is the top ranked job for multiple of the workers, then a winner and losers are selected. The losers then move to their second ranked job and so forth until all workers are assigned a job. Thereafter, this process repeats until all jobs have been assigned or until all shifts have ended.

As discussed with respect to step 56, a conflict occurs when two or more workers attempt to select the same job. In this case, one worker is selected to receive the job while the other workers move to the next selection in their ranked lists. The round ends when all workers have either selected a job or run out of jobs on their list.

When multiple workers have selected the same job, a battle ensues where the relative advantages and drawbacks are compared for each candidate worker and a winner is chosen. A weighting score each worker assigned to the job is used as a basis of how valuable the job is to that particular worker. The worker with the highest weighting for the job in question may be awarded the job.

To avoid a situation where a worker is subject to either a winning or losing streak, workers that lose battles may be awarded points that are used in subsequent conflicts. The points are used to scale the weightings each worker presents when resolving conflict. For example, a worker may lose a point when winning a conflict and may gain a point when losing one. A system-wide constant may specify the amount of scaling each point applies.

Workforce Routing Example

Figure 7:
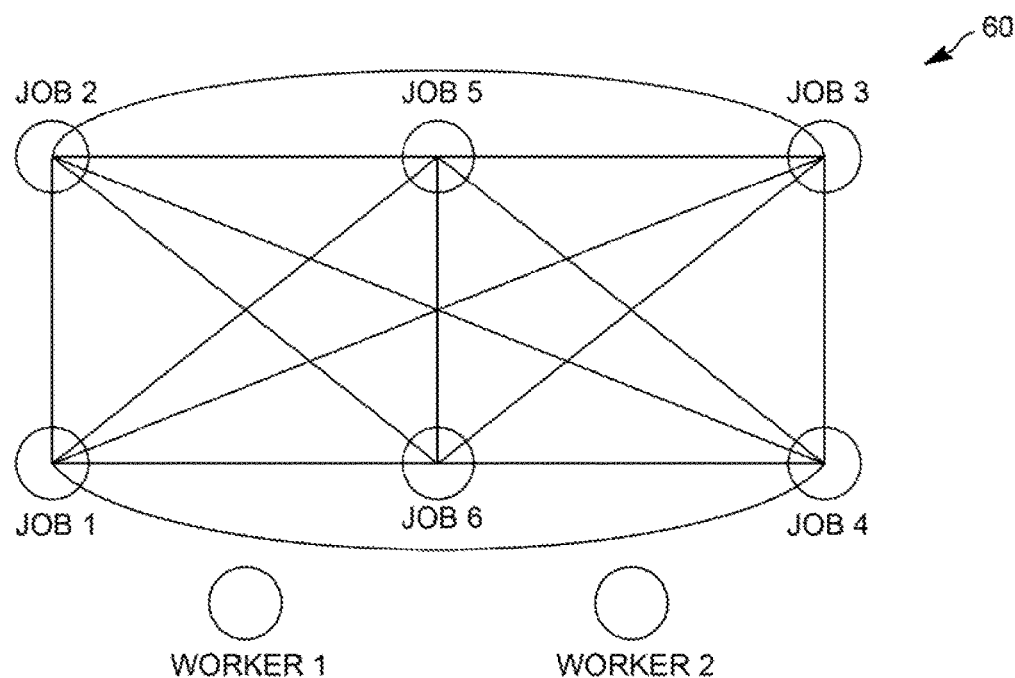
FIG. 7 is a diagram showing an example of a series of jobs to be assigned between a pair of workers in accordance to a workforce routing embodiment.

A workforce routing scenario 60 is shown in FIG. 7 and identifies six jobs (Job 1, Job 2, Job 3, Job 4, Job 5, and Job 6) and two workers (Worker 1 and Worker 2). For purposes of starting the routing process, all jobs are connected to all other jobs and all workers are connected to all jobs. For this example, all connections are assumed to be two-way.

Figure 8:
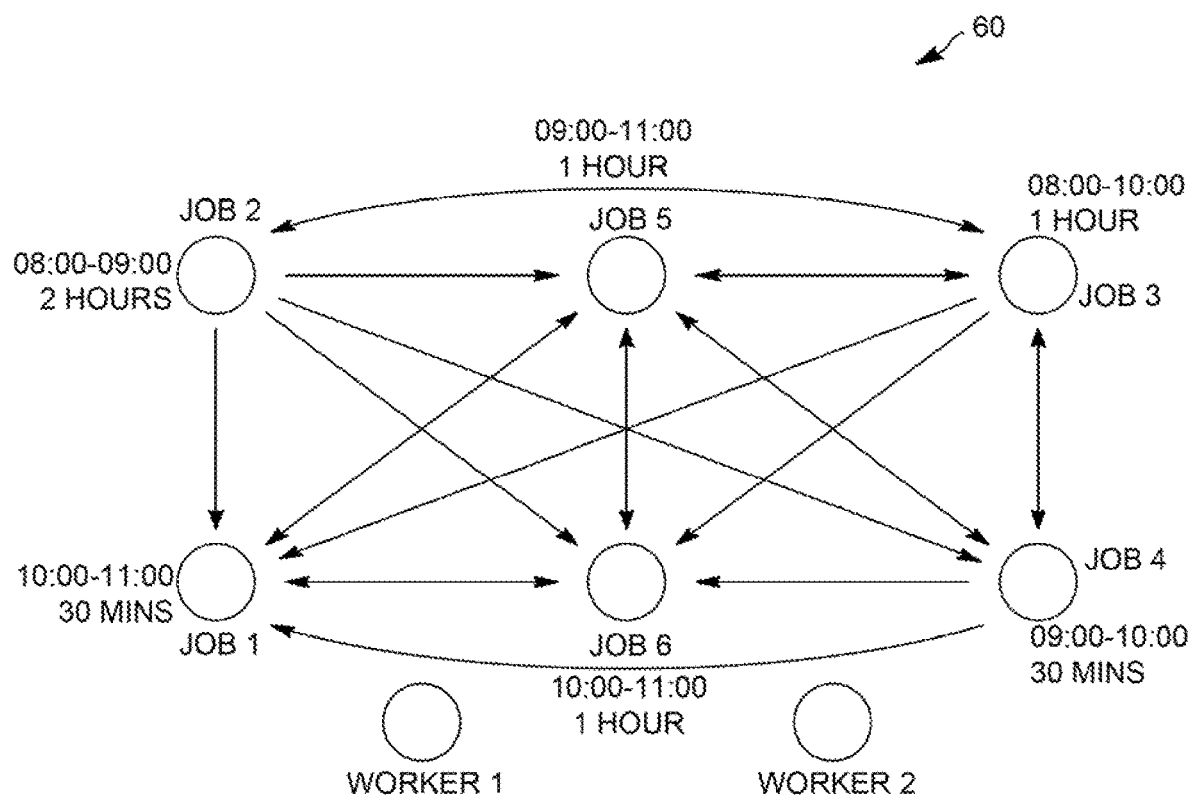
FIG. 8 is a diagram showing the series of jobs to be assigned between a pair of workers as shown in FIG. 7 with scheduling times listed for each job in accordance to a workforce routing embodiment.

When time windows are considered as indicated in FIG. 8, several connections can be removed or made one way due to jobs that may start before others are finished. This reduces the number of arcs in the system. Tables 2 and 3 provided below show the set of possible connections. Worker connections are not shown in FIGS. 7 and 8 for clarity.

In this example, it is assumed that both workers can start with any job. As discussed above, there are cases where the end of the time window for the destination job is before the start of the time window for the source job, and thus the arc represents a transition that could never be taken. The various connections may be viewed in the form of a grid as provided in Table 2 (distances) and Table 3 (estimated travel time) which list the distances and estimated travel times for each of the job-to-job connections (i.e., arcs). The ratio of distance to estimated travel time is not always consistent or the same.

TABLE 2

| DISTANCES | | FROM (in miles) | | | | | | |
|---|---|---|---|---|---|---|---|---|
| | | Job 1 | Job 2 | Job 3 | Job 4 | Job 5 | Job 6 | Worker 1 | Worker 2 |
| TO (in miles) | Job 1 | | 13 | 14 | 17 | 11 | 12 | 6 | 9 |
| | Job 2 | | | 20 | | | | 8 | 10 |
| | Job 3 | | 22 | | 8 | 7 | | 12 | 10 |
| | Job 4 | | 14 | 8 | | 9 | 9 | 10 | 8 |
| | Job 5 | 10 | 7 | 4 | 11 | | 13 | 9 | 11 |
| | Job 6 | 8 | 11 | 11 | 9 | 10 | | 7 | 7 |

TABLE 3

| TRAVEL TIMES | | FROM (in minutes) | | | | | | |
|---|---|---|---|---|---|---|---|---|
| | | Job 1 | Job 2 | Job 3 | Job 4 | Job 5 | Job 6 | Worker 1 | Worker 2 |
| TO (in mins.) | Job 1 | | 30 | 28 | 30 | 21 | 18 | 12 | 14 |
| | Job 2 | | | 29 | | | | 15 | 21 |
| | Job 3 | | 32 | | 17 | 21 | | 20 | 19 |
| | Job 4 | | 26 | 17 | | 20 | 24 | 22 | 15 |
| | Job 5 | 20 | 16 | 12 | 26 | | 22 | 17 | 20 |
| | Job 6 | 19 | 24 | 18 | 13 | 18 | | 15 | 12 |

Table 4 lists the skills that are required for each of the jobs. In this example, the jobs relate to a worker of a company providing television, Internet, and telephone services and the jobs do not list the proficiency levels that are required; rather, only workers list proficiency levels with their skills. Business objectives are used to specify what level of proficiency constitutes having a skill. The columns in Table 4 listing worker skills reflect the skills which the workers have at the required level of proficiency as indicated, for instance, in a business objective configuration setting.

TABLE 4

| SKILLS | Job 1 | Job 2 | Job 3 | Job 4 | Job 5 | Job 6 | Worker 1 | Worker 2 |
|---|---|---|---|---|---|---|---|---|
| Install | X | | X | | X | X | X | |
| Repair | | X | | X | | X | X | X |
| TV | X | X | X | X | X | X | X | X |
| Internet | | X | X | | X | X | | X |
| Telephone | | | | X | X | | X | X |

For the purposes of this example it is assumed that both workers have the same 08:00-12:00 shift and that the modeled traffic pattern for this shift period is a sine wave of period $0 \leq x \leq \pi$. For example, see the amplification curve 62 in FIG. 9.

The following description provides a step-by-step walk-through of the routing process for the six jobs, two worker scenario 60 described above. Each job selection round is analyzed to provide an insight into the process used to build the resulting routes for the two workers.

First Round of Iterative Route Creation Process

Both workers rank all of the jobs available to them. Below is a detailed analysis of the process by which Worker 1 ranks each of the six jobs. The rankings for Worker 2 are also presented but are not analyzed in the same detail as the same processes can be applied to arrive at the relevant results.

The scores for each component are calculated. The scores are then strengthened by their coefficients. Finally the resulting appeals (score multiplied by strengthening coefficient) are added together to produce a total appeal value or score for each job. Rankings are applied by sorting the jobs by their appeal.

Table 5 shows the weightings for each job for Worker 1 at 08:00. The right-most column of strength shows the strengthening coefficients for each of the components. For each component, both the unmodified score and strengthened appeal values are included. The total appeal and resulting rankings are shown at the bottom of Table 5.

TABLE 5

| WORKER 1 ROUND 1 (08:00) | | | | | | | |
|---|---|---|---|---|---|---|---|
| Weightings | Job 1 | Job 2 | Job 3 | Job 4 | Job 5 | Job 6 | Strength |
| Distance | 6 | 8 | 12 | 10 | 9 | 7 | 1.0 |
| score | 0.2923 | 0.2297 | 0.1221 | 0.1726 | 0.2004 | 0.2604 | |
| appeal | 0.2923 | 0.2297 | 0.1221 | 0.1726 | 0.2004 | 0.2604 | |
| Travel Time | 12 | 15 | 20 | 22 | 17 | 15 | 1.0 |
| score | 0.2222 | 0.1642 | 0.0843 | 0.0590 | 0.1295 | 0.1642 | |
| appeal | 0.2222 | 0.1642 | 0.0843 | 0.0590 | 0.1295 | 0.1642 | |
| Skills | | | | | | | 1.5 |
| score | 1.00 | 0.66 | 0.66 | 1.00 | 0.75 | 0.75 | |
| appeal | 1.5 | 0.99 | 0.99 | 1.5 | 1.125 | 1.125 | |

TABLE 5-continued

WORKER 1 ROUND 1 (08:00)

| Weightings | Job 1 | Job 2 | Job 3 | Job 4 | Job 5 | Job 6 | Strength |
|---|---|---|---|---|---|---|---|
| Slack Time | 108 | 0 | 0 | 38 | 43 | 105 | 1.0 |
| score | 0.0068 | 1.0000 | 1.0000 | 0.1727 | 0.1371 | 0.0078 | |
| appeal | 0.0068 | 1.0000 | 1.0000 | 0.1727 | 0.1371 | 0.0078 | |
| Time Slot | 0 | 15 | 20 | 0 | 0 | 0 | 2.5 |
| score | 1.000 | 1.000 | 0.7937 | 1.0000 | 1.0000 | 1.0000 | |
| appeal | 2.5 | 2.5 | 1.9842 | 2.5 | 2.5 | 2.5 | |
| Total Appeal | 4.5213 | 4.8839 | 4.1806 | 4.4043 | 4.0920 | 4.0574 | |
| Ranking | 2 | 1 | 4 | 3 | 5 | 6 | |

The skills and timeslot components in this example have been strengthened, meaning that their output values will contribute more strongly to the overall appeal of the jobs considered. For instance, the score for the skills is multiplied by 1.5 and the score for time slot has been multiplied by 2.5.

The following is a walkthrough of the calculations for each of the weighting components to demonstrate how the values for score and appeal are calculated. Only a sample of the calculations for each component is shown for brevity.

The following formulas can be used to calculate the distance component score for each of the jobs considered by Worker 1. The worker's virtual time clock is used to determine how many hours of the current shift period have elapsed.

h=hours elapsed in shift period
p=length of shift period (in hours)
l=longest distance in graph $$e = \sin\left(\frac{\pi h}{p}\right) l$$

$$j = \begin{cases} :d < e & \cos\left(\frac{\pi d}{2e}\right) \\ :d = e & 0 \\ :d > e & -\sin\left(\frac{\pi(d-e)}{2(l-e)}\right) \end{cases}$$

$$\text{score} = \frac{j+1}{2}$$

Since this is the first selection, the longest distance includes arcs connecting the workers to their first job. The longest arc is between Job 2 and Job 3 at 22 miles, and therefore l equals 22. This is the beginning of the shift so h is 0 and since the shift is from 08:00-12:00, the length of the shift period or p is 4. Thus: h=0; p=4; l=22; and $$e = \sin\left(\frac{0\pi}{4}\right) 22 = 0.$$

Using the formula for j where distance (d) is greater than the estimate (e):

$$j = -\sin\left(\frac{\pi(6-0)}{2(22-0)}\right) = -\sin\left(\frac{6\pi}{44}\right) \cong -0.4154$$

$$\text{score} = \frac{(-0.4154+1)}{2} \cong 0.2923$$

This can be observed in the cell in Table 5 showing the distance score for Job 1.

The travel time component is calculated using the same formulae as with the distance component. The value for l is the maximum travel time on any arc rather than the maximum distance. Here: h=0; p=4; l=32; and $$e = \sin\left(\frac{0\pi}{4}\right) 32 = 0.$$

Using the formula for j where distance (d) is greater than the estimate (e):

$$j = -\sin\left(\frac{\pi(12-0)}{2(32-0)}\right) = -\sin\left(\frac{12\pi}{64}\right) \cong -0.5556$$

$$\text{score} = \frac{(-0.5556+1)}{2} \cong 0.2222$$

This can be observed in the Table 5 of results for Worker 1 of Round 1.

The skill weighting represents the percentage of the skills required for the job that the worker possesses at the appropriate proficiency level. Looking at Table 6 of required skills it can be seen that there are four jobs for which Worker 1 is missing one skill (i.e., "Internet").

TABLE 6

| SKILLS | Job 1 | Job 2 | Job 3 | Job 4 | Job 5 | Job 6 | Worker 1 |
|---|---|---|---|---|---|---|---|
| Install | X | | X | | X | X | X |
| Repair | | X | | X | | X | X |
| TV | X | X | X | X | X | X | X |
| Internet | | X-missing | X-missing | | X-missing | X-missing | |
| Telephone | | | | X | X | | X |

The above described information leads to the values provided in Table 5 above for the "Skills" row. For instance, for Jobs 2 and 3, Worker 1 has 66% of the required skills, whereas for Jobs 5 and 6, Worker 1 has 75% of the required skills. For Jobs 1 and 4, Worker 1 has all (100%) required skills. In this example, the skill objective scores are strengthened by a factor of 1.5. See Table 5.

Additional factors used to develop an overall score or appeal in the above referenced example are so-called "slack time" and "time slot". Slack time describes the amount of time a worker may be idling between jobs, and time slot represents how early in the scheduled time window the worker would likely arrive.

The slack time and time slot scores are calculated using exponential decay with an initial x-offset. In other words, a penalty is assessed for each minute over an acceptable threshold (15 minutes in this example) for each minute over that threshold the worker is expected to arrive. Each additional minute is penalized more heavily than the last. So a worker arriving fifteen minutes late is not penalized at all. A worker arriving twenty minutes late is penalized a small amount, a worker arriving thirty minutes late is penalized a lot more, and a worker arriving sixty minutes late is penalized so heavily as to barely receive any score value from the slack time component at all.

By way of example, Job 1 is scheduled to start at 10:00 (see FIG. 10). Worker 1 has a shift that starts at 8:00 and it is estimated travel time to Job 1 by Worker 1 is twelve minutes. Accordingly, Worker 1 can readily arrive by 10:00 to the job location; thus, the time slot is considered to be 0 minutes corresponding to a full score of 1.0. In contrast, Worker 1 will have a lot of slack time. For instance, Worker 1 may arrive at Job 1 at 8:12. Thus, the slack time before Job 1 is scheduled is 108 minutes. This is considered too high and the corresponding score is very low (i.e., 0.0068). Scores for the other jobs are calculated in a similar manner.

Accordingly, after scores are calculated for each category or factor (distance, travel time, skills, slack time, time slot), they are multiplied by the strength value to produce an appeal value for each category. These values are totaled as shown in the second to last row in Table 5 and rankings are generated from highest to lowest. Thus, for the first round, Job 2 is the highest ranked job for Worker 1. As shown in FIG. 10, step 58, if this is not the highest ranked job for Worker 2, then Worker 1 is assigned Job 2 to begin the shift and Worker 2 is assigned another one of the jobs that is highest ranked for Worker 2. Alternatively, if Job 2 is highest ranked for both Worker 1 and Worker 2, the worker with the highest total appeal value is awarded the job and the other worker is assigned their second ranked job. This iterative process continues for round 2 and round 3 until all six of the jobs are assigned to Worker 1 and Worker 2 or until the end of the shift is reached.

Example of Venturing as a Scoring Component

In some embodiments, "venturing" can be used as a scoring component. For example, in an embodiment, the manner in which scoring components affect route creation may be as follows: when a virtual worker searches for a job, it ranks all of the jobs that are currently available to it. This ranking value is comprised of several different components, one of which is the venturing score.

In the example below, a worker has three available options, Job A, Job B, or Job C. The worker might score these three jobs, as follows.

TABLE 7

| Job | Score |
|---|---|
| Job A | 5.3 |
| Job B | 4.1 |
| Job C | 6.2 |

The above referenced score may be a composite of different scoring components. Accordingly, the 5.3 score for Job A listed above might have been derived as shown in Table 8.

TABLE 8

| Job A | |
|---|---|
| Scoring component | Score |
| Distance | 0.70 |
| Travel | 0.55 |
| Skills | 0.83 |
| Equipment | 0.84 |
| Schedule | 0.61 |
| Wait Time | 0.94 |
| Venturing | 0.83 |

In an embodiment, an illustrative example of the formula used to derive the venturing score is:

$$s = \frac{\left(\sin\left(2\pi\frac{h}{p}\right)d\right) + l}{2l}$$

where:
h=elapsed hours in shift
p=length of shift (in hours)
d=additional travel time from home
l=longest single path incoming to worker depot
s=scaled appeal If the longest incoming pathway (from a job) to the worker depot had a travel time of thirty-eight minutes, and the worker was one hour through an eight hour shift, then the scaled appeal for a job that takes the worker an additional seventeen minutes from home would be:
h=1
p=8
d=17
l=38

$$s = \frac{\left(\sin\left(2\pi\frac{1}{8}\right) \times 17\right) + 38}{2 \times 38}$$

Thus, using rounded values for illustrative purposes, an approximate value of s (rounded to 2 decimal places) would be as follows for the above example:

$$s = \frac{(0.7071 \times 17) + 38}{76} = \frac{50.02081528}{76} = 0.65$$

Higher scores are considered to be better, so in the example above, the worker would rank choices Job A, Job B, and Job C in descending order by score, as shown in Table 9.

TABLE 9

| Rank | Job | Score |
|---|---|---|
| 1 | Job C | 6.2 |
| 2 | Job A | 5.3 |
| 3 | Job B | 4.1 |

As illustrated above, the venturing scoring component has influenced the ranking (and subsequently the selection) of jobs alongside other factors used to make a job selection choice in the process of building workforce routing.

The effect of the weighting can then be strengthened to reflect how important the concept of venturing is on the final outcome. For example, in a further illustrative example of an embodiment with strengthening, a company with a workforce might weight their scoring components as shown in Table 10.

TABLE 10

| Scoring component | Weight | Strengthen by |
|---|---|---|
| Distance | High | 5 |
| Travel | Low | 1 |
| . | . | . |
| . | . | . |
| . | . | . |
| Venturing | High | 5 |

In such a scenario, rather than using the raw score output by the venturing component, the venturing scoring component would be multiplied by a factor of 5 before being aggregated.

While the principles of the invention have been described above in connection with specific devices, apparatus, systems, and/or methods, it is to be clearly understood that this description is made only by way of example and not as limitation. Particular embodiments, for example, may be implemented in a non-transitory computer-readable storage medium for use by or in connection with an instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

Accordingly, given the above examples, an embodiment may be provided by a computer-implemented method for workforce scheduling. The method includes executing on a processor the step of generating a capacity model that associates distances of locations within a service area from a location of a depot from which workers servicing the service area are dispatched with a series of appointment time windows available for scheduling within a pre-determined time period such that appointment time windows having a relatively greater amount of available worker capacity are associated with a greater range of distances than appointment time windows having a relatively smaller amount of available worker capacity. Thereafter, a distance from the depot to a location of an appointment being scheduled within the service area may be determined and at least one appointment time window suggestion is automatically produced for the appointment being scheduled based on the appointment time windows that are defined in the capacity model associated with the distance from the depot to the location of the appointment being scheduled.

The method may include providing the appointment time window suggestions to a booking agent for use in scheduling an appointment and may include dynamically updating the capacity model as available worker capacity within at least one appointment time window changes. The method may also include the step of providing the capacity model as an input to an automated workforce routing system.

In addition, an earlier set of appointment time windows may be designated for outbound travel to locations of appointments within the service area relative to the location of the depot and a later set of appointment time windows may be designated for inbound travel to locations of appointments within the service area relative to the location of the depot. Further, a beginning of an earliest appointment time window and an end of a latest appointment time window within the series of appointment time windows may be associated with the location of the depot, and a transition between the set of appointment time windows designated for outbound travel and the set of appointment time windows designated for inbound travel may be associated with a distance representing an outermost boundary of the service area for workers dispatched from the depot such that the capacity model associates one outbound appointment time window and one inbound appointment time window for each location within the service area. The transition may correspond to the mid-point of the series of appointment time windows as measured in time.

A percentage of the distance between the location of the depot and the outermost boundary associated with an individual appointment time window within the set of appointment time windows designated for outbound travel may correspond to a percentage of the amount of available worker capacity within the individual appointment time window relative to the aggregate of available worker capacities for the set of appointment time windows designated for outbound travel.

The capacity model may be displayed in various forms. For instance, a display in the form of a distance line having a length corresponding to a distance from the depot to the outermost boundary with the set of appointment time windows designated for outbound travel identified lengthwise on one side of the distance line and the set of appointment time windows designated for inbound travel identified lengthwise on an opposite side of the distance line may be utilized. Alternatively, the capacity model in the form of at least one radial plot having a center representing the location of the depot and a radius of a length representing a distance from the depot to the outermost boundary of the service area and a series of concentric rings representing the set of appointment time windows designated for one of outbound travel and inbound travel may be utilized.

While the principles of the invention have been described above in connection with specific devices, apparatus, systems, algorithms, booking agents, and/or methods, it is to be clearly understood that this description is made only by way of example and not as limitation. One of ordinary skill in the art will appreciate that various modifications and changes can be made without departing from the scope of the claims below.

A system for carrying out the above methods may include software or the like provided on a circuit board or within another electronic device and can include various processors, microprocessors, controllers, chips, disk drives, and the like. It will be apparent to one of ordinary skill in the art that systems, modules, processors, servers, and the like may be implemented as electronic components, software, hardware or a combination of hardware and software for purposes of providing a system.

An embodiment may also include at least one non-transitory computer readable storage medium having computer program instructions stored thereon that, when executed by at least one processor, can cause the at least one processor to perform any of the steps described above.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for workforce scheduling, the method comprising: generating a capacity model comprising data and a plurality of associations that associate distance data for distances of locations within a service area, the distances being from a location of a depot from which workers servicing the service area are dispatched, with appointment time window data for a series of appointment time windows available for future scheduling of respective appointments with customers within a pre-determined time period, each respective appointment scheduled prior to assigning a work crew to service the appointment; wherein for a plurality of the appointment time windows, each appointment time window having an equal fixed duration, and each appointment time window having a respective effective coverage representing available aggregate worker capacity representing the total available work force during the appointment time window, wherein the effective coverage is not equal for all appointment time windows, the capacity model associates each appointment time window with a respective range of distances, such that appointment time windows having a relatively greater amount of available worker capacity are associated with a greater range of distances than appointment time windows having a relatively smaller amount of available worker capacity; determining a distance from the depot to a location of an appointment being scheduled within the service area; automatically producing decision assistance data comprising appointment time window suggestions for the appointment being scheduled, the decision assistance data based on the appointment time windows that are defined in the capacity model as being associated with the distance from the depot to the location of the appointment being scheduled; and providing the decision assistance data to an agent for appointment scheduling, wherein the appointment time windows are displayed via at least one of a first and second interactive graphical user interfaces, the first interactive graphical user interface arranged along a distance line representing a maximum distance of appointments made during each respective window and the width of each window proportional to available workforce capacity, the second interactive graphical user interface displaying appointment time windows arranged radially around an origin representing the location of the depot, the radial distance of each window from the origin representing the maximum distance of appointments made during each respective window and the width of windows proportional to available workforce capacity; where the appointment time window suggestions correspond to one or more of the appointment time windows based on the distance from the depot to the location of the appointment being scheduled; and where selection of one of the appointment time window suggestions in the graphical user interface dynamically updates the respective width of at least one window.

2. The method according to claim 1, further comprising the step of providing the appointment time window suggestions to a booking agent for use in scheduling an appointment.

3. The method according to claim 1, further comprising the step of dynamically updating the capacity model and adjusting widths of the appointment time windows along the distance line as available worker capacity within at least one appointment time window changes due to scheduling appointments.

4. The method according to claim 3, further comprising the step of providing the capacity model as an input to an automated workforce routing system; and generating routes including a sequence of appointments for the workers of the workforce based on the dynamically updated the capacity model, via the automated workforce routing system, such that grouping or chaining of the sequence of appointments is based upon the locations of the appointments.

5. The method according to claim 1, wherein, during said generating, an earlier set of appointment time windows is designated for outbound travel to locations of appointments within the service area relative to the location of the depot, and a later set of appointment time windows is designated for inbound travel to locations of appointments within the service area relative to the location of the depot.

6. The method according to claim 5, wherein, during said generating, a beginning of an earliest appointment time window and an end of a latest appointment time window within the series of appointment time windows is associated with the location of the depot, and a transition between the set of appointment time windows designated for outbound travel and the set of appointment time windows designated for inbound travel is associated with a distance representing an outermost boundary of the service area for workers dispatched from the depot such that the capacity model associates one outbound appointment time window and one inbound appointment time window for each location within the service area.

7. The method according claim 6, wherein the transition corresponds to the mid-point of the series of appointment time windows as measured in time.

8. The method according claim 6, wherein, during said generating, a percentage of the distance between the location of the depot and the outermost boundary associated with an individual appointment time window within the set of appointment time windows designated for outbound travel corresponds to a percentage of the amount of available worker capacity within the individual appointment time window relative to the aggregate of available worker capacities for the set of appointment time windows designated for outbound travel.

9. The method according claim 6, further comprising the step of displaying the capacity model in the form of the distance line having a length corresponding to a distance from the depot to the outermost boundary with the set of appointment time windows designated for outbound travel identified lengthwise on one side of the distance line and the set of appointment time windows designated for inbound travel identified lengthwise on an opposite side of the distance line.

10. The method according claim 6, further comprising the step of displaying the capacity model in the form of at least one radial plot having a center representing the location of the depot and a radius of the distance line having a length representing a distance from the depot to the outermost boundary of the service area and a series of concentric rings representing the set of appointment time windows designated for one of outbound travel and inbound travel.

11. A system for workforce scheduling, comprising: a memory storing instructions; and at least one processor configured to execute the instructions to: generate a capacity model comprising data and a plurality of associations that associate distance data for distances of locations within a service area, the distances being from a location of a depot from which workers servicing the service area are dispatched, with appointment time window data for a series of appointment time windows available for future scheduling of respective appointments with customers within a pre-determined time period, each respective appointment scheduled prior to assigning a work crew to service the appointment, wherein for a plurality of the appointment time windows, each appointment time window having an equal fixed duration, and each appointment time window having a respective effective coverage representing available aggregate worker capacity representing the total available work force during the appointment time window, wherein the effective coverage is not equal for all appointment time windows, the capacity model associates each appointment time window with a respective range of distances, such that appointment time windows having a relatively greater amount of available worker capacity are associated with a greater range of distances than appointment time windows having a relatively smaller amount of available worker capacity; said at least one processing being configured to determine a distance from the depot to a location of an appointment being scheduled within the service area; said at least one processing being configured to automatically produce decision assistance data comprising appointment time window suggestions for the appointment being scheduled, the decision assistance data based on the appointment time windows that are defined in the capacity model as being associated with the distance from the depot to the location of the appointment being scheduled; and provide the decision assistance data to an agent for appointment scheduling, wherein the appointment time windows are displayed via at least one of a first and second interactive graphical user interfaces, the first interactive graphical user interface arranged along a distance line representing a maximum distance of appointments made during each respective window and the width of each window proportional to available workforce capacity, the second interactive graphical user interface displaying appointment time windows arranged radially around an origin representing the location of the depot, the radial distance of each window from the origin representing the maximum distance of appointments made during each respective window and the width of windows proportional to available workforce capacity; where the appointment time window suggestions correspond to one or more of the appointment time windows based on the distance from the depot to the location of the appointment being scheduled; and where selection of one of the appointment time window suggestions in the graphical user interface dynamically updates the respective width of at least one window.

12. The system according to claim 11, wherein said at least one processor is configured to execute the instructions to provide the appointment time window suggestions to a booking agent for use in scheduling an appointment.

13. The system according to claim 11, wherein said at least one processor is configured to execute the instructions to dynamically update the capacity model and adjust widths of the appointment time windows along the distance line as available worker capacity within at least one appointment time window changes due to scheduling appointments.

14. The system according to claim 13, wherein said at least one processor is configured to execute the instructions to: provide the capacity model as an input to an automated workforce routing system; and generate routes including a sequence of appointments for the workers of the workforce based on the dynamically updated the capacity model, via the automated workforce routing system, such that grouping or chaining of the sequence of appointments is based upon the locations of the appointments.

15. The system according to claim 1, wherein said at least one processor is configured to execute the instructions to designate an earlier set of appointment time windows for outbound travel to locations of appointments within the service area relative to the location of the depot, and a later set of appointment time windows for inbound travel to locations of appointments within the service area relative to the location of the depot.

16. The system according to claim 5, wherein said at least one processor is configured to execute the instructions to associate a beginning of an earliest appointment time window and an end of a latest appointment time window within the series of appointment time windows with the location of the depot, and to associate a transition between the set of appointment time windows designated for outbound travel and the set of appointment time windows designated for inbound travel with a distance representing an outermost boundary of the service area for workers dispatched from the depot such that the capacity model associates one outbound appointment time window and one inbound appointment time window for each location within the service area.

17. A non-transitory computer-readable storage medium comprising stored instructions which, when executed by one or more computer processors, cause the one or more computer processors to perform steps of operations comprising: generating a capacity model comprising data and a plurality of associations that associate distance data for distances of locations within a service area, the distances being from a location of a depot from which workers servicing the service area are dispatched, with appointment time window data for a series of appointment time windows available for future scheduling of respective appointments with customers within a pre-determined time period, each respective appointment scheduled prior to assigning a work crew to service the appointment, wherein for a plurality of appointment time windows, each appointment time window having an equal fixed duration, and each appointment time window having a respective effective coverage representing available aggregate worker capacity representing the total available work force during the appointment time window, wherein the effective coverage is not equal for all appointment time windows, the capacity model associates each appointment time window with a respective range of distances, such that appointment time windows having a relatively greater amount of available worker capacity are associated with a greater range of distances than appointment time windows having a relatively smaller amount of available worker capacity; determining a distance from the depot to a location of an appointment being scheduled within the service area; automatically producing decision assistance data comprising appointment time window suggestions for the appointment being scheduled, the decision assistance data based on the appointment time windows that are defined in the capacity model as being associated with the distance from the depot to the location of the appointment being scheduled; and providing the decision assistance data to an agent for appointment scheduling, wherein the appointment time windows are displayed via at least one of a first and second interactive graphical user interfaces, the first interactive graphical user interface arranged along a distance line representing a maximum distance of appointments made during each respective window and the width of each window proportional to available workforce capacity, the second interactive graphical user interface displaying appointment time windows arranged radially around an origin representing the location of the depot, the radial distance of each window from the origin representing the maximum distance of appointments made during each respective window and the width of windows proportional to available workforce capacity; where the appointment time window suggestions correspond to one or more of the appointment time windows based on the distance from the depot to the location of the appointment being scheduled; and where selection of one of the appointment time window suggestions in the graphical user interface dynamically updates the respective width of at least one window.

18. The non-transitory computer-readable storage medium according to claim 17, wherein the instructions when executed by the one or more computer processors, cause the one or more computer processors to perform operations comprising dynamically updating the capacity model and adjusting widths of the appointment time windows along the distance line as available worker capacity within at least one appointment time window changes due to scheduling appointments.

19. The non-transitory computer-readable storage medium according to claim 18, wherein the instructions when executed by the one or more computer processors, cause the one or more computer processors to perform operations comprising: providing the capacity model as an input to an automated workforce routing system; and generating routes including a sequence of appointments for the workers of the workforce based on the dynamically updated the capacity model, via the automated workforce routing system, such that grouping or chaining of the sequence of appointments is based upon the locations of the appointments.

* * * * *